(12) United States Patent
Verraes

(10) Patent No.: US 10,179,847 B2
(45) Date of Patent: Jan. 15, 2019

(54) LIQUID PLASTICISING COMPOSITION

(71) Applicant: ROQUETTE FRERES, Lestrem (FR)

(72) Inventor: Arnaud Verraes, Wavrin (FR)

(73) Assignee: ROQUETTE FRERES, Lestrem (FR)

( * ) Notice: Subject to any disclaimer, the term of this patent is extended or adjusted under 35 U.S.C. 154(b) by 7 days.

(21) Appl. No.: 15/502,360

(22) PCT Filed: Aug. 6, 2015

(86) PCT No.: PCT/FR2015/052170
§ 371 (c)(1),
(2) Date: Feb. 7, 2017

(87) PCT Pub. No.: WO2016/020624
PCT Pub. Date: Feb. 11, 2016

(65) Prior Publication Data
US 2017/0226319 A1    Aug. 10, 2017

(30) Foreign Application Priority Data

Aug. 7, 2014 (FR) ...................................... 14 57674

(51) Int. Cl.
| | |
|---|---|
| *C08K 5/15* | (2006.01) |
| *C08K 5/103* | (2006.01) |
| *C08J 3/18* | (2006.01) |
| *C08L 27/06* | (2006.01) |
| *C08L 91/00* | (2006.01) |
| *C08K 5/1535* | (2006.01) |
| *C08K 5/1515* | (2006.01) |

(52) U.S. Cl.
CPC ............... *C08K 5/1535* (2013.01); *C08J 3/18* (2013.01); *C08K 5/103* (2013.01); *C08K 5/1515* (2013.01); *C08L 27/06* (2013.01); *C08L 91/00* (2013.01); *C08J 2327/06* (2013.01)

(58) Field of Classification Search
CPC ........ C08K 5/1535; C08K 5/1515; C08J 3/18; C08J 2327/06
USPC ........................................................ 524/109
See application file for complete search history.

(56) References Cited

U.S. PATENT DOCUMENTS

| | | | |
|---|---|---|---|
| 2,387,842 A | 10/1945 | Soltzberg | |
| 8,507,596 B2 | 8/2013 | Frenkel | |
| 2002/0019559 A1 | 2/2002 | Brunner et al. | |
| 2009/0301348 A1 | 12/2009 | Grass et al. | |
| 2012/0214920 A1 | 8/2012 | Frenkel | |
| 2013/0184386 A1* | 7/2013 | Coudyser | C08K 5/1535 524/109 |
| 2015/0125613 A1* | 5/2015 | Feron | C07D 493/04 427/385.5 |
| 2015/0291614 A1* | 10/2015 | Feron | C07D 493/04 525/331.5 |
| 2015/0291770 A1* | 10/2015 | Grass | C07D 493/04 524/109 |
| 2015/0322238 A1 | 11/2015 | Feron et al. | |

FOREIGN PATENT DOCUMENTS

| | | |
|---|---|---|
| DE | 10 2011 089 496 A1 | 6/2013 |
| FR | 2 990 210 A1 | 11/2013 |
| FR | 2 998 569 A1 | 5/2014 |
| WO | 99/32427 A1 | 7/1999 |
| WO | 99/45060 A1 | 9/1999 |
| WO | 00/78853 A1 | 12/2000 |
| WO | 2008/095571 A1 | 8/2008 |
| WO | 2013/055961 A1 | 4/2013 |
| WO | 2012/045988 A1 | 4/2014 |
| WO | 2014/080151 A1 | 5/2014 |
| WO | 2014/080152 A1 | 5/2014 |

OTHER PUBLICATIONS

International Search Report, dated Nov. 5, 2015, from corresponding PCT Application.

* cited by examiner

*Primary Examiner* — Michael Bernshteyn
(74) *Attorney, Agent, or Firm* — Oliff PLC

(57) ABSTRACT

A composition that is liquid at room temperature includes at least one 1,4:3,6-dianhydrohexitol diester (A); and at least one compound (B), selected from modified fatty acids and modified fatty acid esters, the compound including at least one epoxy and/or acetyl function. The liquid composition includes at least 60% by weight of constituents (A) and (B).

25 Claims, No Drawings

LIQUID PLASTICISING COMPOSITION

FIELD OF THE INVENTION

A subject of the invention is a plasticizing composition which is liquid at room temperature. Another aspect of the invention relates to the use of this composition for plasticizing polymers.

PRIOR ART

Due to their numerous advantages, the use of synthetic polymers has become widespread in numerous applications since the turn of the century.

However, these polymers may have drawbacks and some limitations, such as, in particular, their mechanical properties, which may be insufficient for certain uses. For example, they may have a very low elongation at break at room temperature or poor impact strength.

Furthermore, it may be necessary to modify the melt-phase behavior of these polymers, especially in order to be able to use them in transformation processes of calendering, or else coating, type. In other words, it is necessary for the polymer to have passed its melting point, or its gel temperature, and thus for the polymer to have, in this molten or gelled state, a viscosity that is suited to the forming process in order to be able to be correctly transformed.

To be able to use them in wider applications, it is also necessary to modify the properties of these polymers, for example to make them more flexible or more resistant to impacts, or else to allow them to have a softer appearance.

For this purpose, these polymers may be mixed with "plasticizers".

"Plasticizer" means any product which, when mixed in sufficient amount with a polymer, has the function of reducing the glass transition temperature of said polymer. By reducing the glass transition temperature of the polymer, the flexibility of the latter is increased and the mechanical properties of this plasticized polymer are modified. Thus, by adding a plasticizer to a polymer composition, a reduction in the modulus, especially in the modulus at 100% elongation, a reduction in the tensile strength and/or an increase in the deformation at break are generally observed.

These modified properties of the polymer then allow it to be used in more varied applications, for example for the manufacture of films or flexible sheets.

During the process for employing the plastic, plasticizers are generally mixed with the polymer, which enables a decrease in the softening point of the polymer.

This mixing may be carried out by various implementation processes.

In the case of polyvinyl chlorides (PVC), for example, the polymer may be transformed into an object via various techniques for transforming thermoplastic materials, and in particular by extrusion, by calendering or by coating via a process of plastisol type.

In order to obtain this thermoplastic mixture, the PVC is mixed with the plasticizer while supplying energy to this system, in the form of temperature and mechanical energy. In the case of extrusion, this mixing takes place in a closed system. In the case of mixing on rolls, this mixing takes place in an open system. The polymer may then be formed, for example via thermoforming or calendering processes. Generally, a step of dry blending is performed before the thermomechanical mixing step.

According to the plastisol process, a mixture is generally prepared to form a PVC paste, this paste is then formed via a coating or molding step, and the paste is then heated in an oven to form the component.

Regardless of the process, the polymer must be correctly melted or gelled in order to be able to satisfactorily form the object obtained at the end of the process.

For reasons of ease of storage, use and metering of the plasticizer, plasticizers that are liquid at room temperature are generally used.

For all these processes for obtaining thermoplastic mixtures from PVC, plasticizers of the phthalic ester family are very often still used. They are, at the present time still, very generally dioctyl phthalate or diisononyl phthalate. These plasticizers are very effective for plasticizing polymers, and are readily available on the market, for a relatively low cost.

However, due to the toxicity problems of phthalates, other plasticizers have also been developed in recent years, such as cyclohexanepolycarboxylic acid and derivatives thereof, which were the subject of patent applications WO 00/78853 and WO 99/32427. By way of example, mention may be made of the diisononyl ester of 1,2-cyclohexanedicarboxylic acid (DINCH) sold by BASF under the brand name Hexamoll®.

Other plasticizers that may also be mentioned include glycerol ester derivatives, such as Grindsted® Soft-N-Safe obtained from glycerol and castor oil and sold by Danisco. These plasticizers have the advantage of being obtained from biosourced products.

The use of 1,4:3,6-dianhydrohexitol derivatives as polymer plasticizers has already been described in document WO 99/45060. These derivatives do not have the toxicity problems of phthalates. These plasticizers also have the advantage of being partially biosourced, or even totally biosourced. This application describes, in the examples, the following plasticizers that are liquid at room temperature: isosorbide dioctanoate, isosorbide dibutanoate, isosorbide dihexanoate and isosorbide di(2-ethylhexanoate). These plasticizers are also described in document WO 2008/095571 A1, which describes aliphatic diesters containing 9 carbon atoms. The document *Preparation of plasticizers from carbohydrate sources. I. Levulinic acid esters. II. Sorbide esters*, (Hachihama et al., Technology reports of the Osaka University, Vol. 3, no 72, 1953, pages 191-200) describes aliphatic esters containing 8 carbon atoms and also aliphatic esters containing 10 carbon atoms. U.S. Pat. No. 2,387,842 A describes mixed aliphatic diesters, these also being useful as plasticizers. Mixtures of this type of esters are also described in applications WO2014080151 A1 and WO2014080152 A1, which are able to be obtained from 1,4:3,6 dianhydrohexitols and mixtures of fatty acids.

The mechanical properties of polymers plasticized with these derivatives are excellent, close to those obtained with plasticizers of phthalate type.

In the context of its research, the Applicant Company has, however, found that these dianhydrohexitol esters have a freezing point which may be close, or even very close, to room temperature, or even greater than room temperature as is the case for isosorbide decanoates. The same applies to the melting point. This poses problems for storage and handling of these dianhydrohexitol esters. Generally speaking, it is advantageous to obtain compositions having freezing and melting points as low as possible.

Moreover, the Applicant Company has been able to observe that, after having been mixed with the polymer, these dianhydrohexitol esters could have a tendency to "migrate" out of the object formed from the plastic material.

This phenomenon is generally defined as the tendency for plasticizers to migrate from the plastics in which they have been incorporated towards other plastic or non-plastic materials placed in close contact. Now, migration of the plasticizer may have the consequences of a loss over time of mechanical and/or optical properties of the polymer, degradation of the appearance and of the feel, or may even pose printing defect problems when it is desired to print the surface of the polymer in a second stage. After having been transformed into a finished product, the plasticized polymer may come back into contact with other objects made of different materials, especially plastic materials, for example a packaging. In this case, it is possible for the plasticizer to migrate from the finished product to the packaging, which has the consequence of the above-described drawbacks. Another possibility is to manufacture multilayer articles comprising a layer of plasticized polymer in contact with one or more layers of a different composition. In this case, the migration of the plasticizer from one layer to another may lead to the appearance of a phenomenon referred to as "curling", that is to say a phenomenon of deformation of the multilayer article linked to a difference in the dimensional stability of the different layers.

There therefore remains a need to find novel plasticizing compositions which are liquid at room temperature, these compositions making it possible to solve at least some of the abovementioned problems.

SUMMARY OF THE INVENTION

The Applicant has precisely, to its merit, managed to find a composition comprising 1,4:3,6-dianhydrohexitol diesters having improved behavior, especially as regards the ease of handling and storage thereof. These compositions make it possible to very effectively plasticize polymers while limiting the abovementioned problems of migration.

The invention thus relates to a composition which is liquid at room temperature and which comprises:
  at least one 1,4:3,6-dianhydrohexitol diester (A);
  at least one compound (B), chosen from modified fatty acids and modified fatty acid esters, said compound (B) bearing at least one epoxy and/or acetyl function;
said liquid composition comprising at least 60% by weight of constituents (A) and (B).

In documents FR2990210 A1, WO99/45060 A1 and WO2008/095571 A1, polymer compositions plasticized with 1,4:3,6-dianhydrohexitol diester are described, the compositions also comprising an epoxidized soybean oil; these constituents are added separately to the polymer. Unlike that which is described in these two documents, the composition according to the invention is a liquid plasticizing composition, which comprises the two constituents and which is used directly in a mixture with the polymer.

This composition, which is useful as polymer plasticizer, also has the advantage of being liquid at room temperature, which enables easy metering of the plasticizer during the manufacture of polymeric objects plasticized using this composition. Due to its lower melting and freezing points, it can be readily handled and stored before use.

The composition also has the advantage of being able to be used for plasticizing plastic materials, especially polyvinyl chloride.

DETAILED DESCRIPTION OF THE INVENTION

A first subject of the invention relates to a composition which is liquid at room temperature, this composition being useful as plasticizing composition.

A "plasticizing composition" is a composition which is able to plasticize polymers. Thus, it may be a composition which, when it is mixed in a sufficient amount with a polymer, makes it possible to decrease the glass transition temperature of said polymer.

"Liquid at room temperature" generally means a composition having melting and freezing points both greater than 15° C.

The composition of the invention comprises a 1,4:3,6-dianhydrohexitol diester (A).

The 1,4:3,6-dianhydrohexitol is a diol with empirical formula $C_6H_{10}O_4$.

According to the invention, three isomers of 1,4:3,6-dianhydrohexitol are used: isosorbide, isomannide and isoiodide, preferentially isosorbide.

Preferably, at least one 1,4:3,6-dianhydrohexitol diester (A) is an alkyl diester.

Preferably, in the case of a mixture of compounds (A), it consists of 1,4:3,6-dianhydrohexitol alkyl diesters.

The alkyl groups of the 1,4:3,6-dianhydrohexitol esters are advantageously $C_{1-24}$ alkyl groups, preferably $C_{3-15}$, most preferentially $C_{4-11}$, in particular $C_{6-9}$ alkyl groups.

The alkyl group may be a cycloalkyl, linear alkyl or branched alkyl group. Preferentially, the alkyl group is linear or branched, most preferentially linear.

This alkyl ester is produced by esterification reaction of the 1,4:3,6-dianhydrohexitol with a carboxylic acid. An esterification reaction may be written as follows:

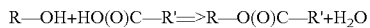

$$R\text{—}OH+HO(O)C\text{—}R' \Longrightarrow R\text{—}O(O)C\text{—}R'+H_2O$$

Thus, if the acid used for the esterification comprises 8 carbon atoms, the alkyl group of the ester is R' and is therefore a $0_7$ alkyl group.

By way of example of carboxylic acid, mention may be made of acetic acid, butyric acid, valeric acid, caproic acid, enanthic acid, caprylic acid, pelargonic acid, nonanoic acid, capric acid, undecylic acid, lauric acid, tridecylic acid, myristic acid, pentadecylic acid, palmitic acid.

In the case in which only one of the two alcohol functions of the diol has reacted by esterification, the ester is a monoester. It is a diester in the case in which the two alcohol functions of the diol have reacted in an esterification reaction. The 1,4:3,6-dianhydrohexitol ester suitable for the invention is a diester. It may comprise different alkyl groups, that is to say that the diester is obtained with two different carboxylic acids, for example from a mixture of capric acid and caprylic acid or else a mixture of capric acid, caprylic acid and lauric acid.

A composition comprising a mixture of 1,4:3,6-dianhydrohexitol esters is of course in accordance with the invention. By way of example of mixture of esters which may be used according to the invention, mention may be made of those described in applications WO2014080151 A1 and WO2014080152 A1.

The composition also comprises at least one compound (B), different from the compound (A), and chosen from modified fatty acids and modified fatty acid esters, said compound (B) bearing at least one epoxy and/or acetyl function.

Preferably, the composition according to the invention comprises, as compound (B), at least one modified fatty acid ester. Preferably, in the case of a mixture of compounds (B), this mixture consists of a mixture of modified fatty acid esters.

Advantageously, at least one of these modified fatty acid esters is a glyceride comprising at least one modified fatty acid, that is to say that at least one modified fatty acid is chemically bonded to the glycerol; preferably, at least one of these modified fatty acid esters is a triglyceride comprising at least one modified fatty acid.

Preferably, in the case of a mixture of compounds (B), it consists of a mixture of triglycerides comprising at least one modified fatty acid.

According to the invention, the modified fatty acid or the modified fatty acid ester bears at least one epoxy and/or acetyl function.

Regarding the epoxy function, it may be obtained from a fatty acid or a fatty acid ester bearing at least one carbon-carbon double bond: the epoxy function may be obtained by an epoxidation reaction of the double bond.

Regarding the acetyl function, it may be obtained by acetylation of a hydroxyl function or else an epoxide function, for example by reaction of acetic anhydride on one of the two functions mentioned above. As examples of compounds (B) bearing at least one acetyl function, mention may be made of the compounds (II) described in application US 2012/0214920, which are able to be obtained by acetylation of fatty acids bearing at least one epoxy function or mono- or diglycerides comprising these fatty acids bearing at least one epoxy function.

Preferably, at least one of the compounds (B) bears at least one epoxy function. According to this variant, in the case of a mixture of compounds (B), it advantageously consists of a mixture of compounds (B) which bear at least one epoxy function. Most preferentially, at least one of the compounds (B) is a triglyceride of at least one modified fatty acid bearing at least one epoxy function. According to this most preferred variant, in the case of a mixture of compounds (B), it advantageously consists of a mixture of triglycerides of at least one modified fatty acid bearing at least one epoxy function. This mixture of triglycerides may be an epoxidized soybean oil and/or an epoxidized linseed oil and/or an epoxidized sunflower oil and/or an epoxidized grapeseed oil and/or an epoxidized palm oil and/or an epoxidized rapeseed oil and/or an epoxidized castor oil, preferably an epoxidized soybean oil. It may also be a mixture of compounds (B) consisting for example of a mixture of epoxidized oil and an ester such as of epoxidized fatty acid, as described for example in application WO 2013055961 A1.

As described above, the composition according to the invention, which has the advantage of being liquid at room temperature (25° C.), is particularly useful for plasticizing polymers.

It is specified that, unless indicated otherwise, the amounts by weight are expressed as dry weight. Moreover, regarding the different constituents, the amounts thereof are expressed relative to the total of all the constituents; for example, for the amount of (A), if different constituents (A) are present in the composition, the amount of the total of all the constituents (A) is expressed.

The liquid composition according to the invention comprises at least 60% by weight of constituents (A) and (B). Advantageously, the composition comprises at least 60% by weight of constituents (A) and (B), preferably at least 80%, most preferentially it consists of constituents (A) and (B).

The weight ratio (A)/(B) may range from 95/5 to 5/95, advantageously from 90/10 to 20/80, preferentially from 85/15 to 30/70, most preferentially from 80/20 to 40/60, or even from 65/35 to 45/55.

In these ratios, and in particular in the preferred ratios, the freezing point of the composition according to the invention is significantly reduced, which makes it possible to facilitate storage and handling of the compositions of the invention.

Moreover, the composition according to the invention has the advantage of being able to be fluid at room temperature, that is to say of being able to have a Brookfield viscosity at 25° C. of less than 2000 mPa·s. This is all the more surprising since certain compounds (B), especially epoxidized oils, may have a viscous, or even gelled, appearance at room temperature.

According to the invention, the composition is liquid at room temperature. The freezing point of the composition (TCc) may be lower than 10° C., advantageously lower than 0° C., preferably lower than −5° C., most preferentially lower than −10° C., for example lower than −15° C.

Advantageously, the freezing point of the composition according to the invention is lower than that of the compound (A) or of the mixture of compounds (A) (TCa). This is all the more surprising since the freezing point of the compound (B) may have a freezing point even higher than that of the compound (A). Preferably, TCc is lower than TCa −2° C., most preferentially lower than TCa −5° C.

According to the invention, the melting point of the composition (TFc) may be lower than 10° C., advantageously lower than 0° C., preferably lower than −5° C., most preferentially lower than −10° C.

Advantageously, the melting point of the composition according to the invention is lower than that of the compound (A) or of the mixture of compounds (A) (TFa). Preferably, TFc is lower than TFa −5° C., most preferentially lower than TFa −10° C.

The freezing and melting points may be determined by measuring the viscosity of the plasticizer as a function of the temperature. To measure this change in viscosity, a drop of plasticizer is placed on a plate of 50 mm diameter and at an angle of 1° (CP 50-1 geometry) for measurement of the viscous and elastic moduli as a function of the temperature. For example, the temperature gradient is 2° C./min, the temperature sweep is from 30° C. to −30° C., the oscillation frequency is 1 Hertz and the deformation is from 1% to 0.1%. The freezing point measured corresponds to the temperature of change of state of the product subjected to the test and corresponds to the crossing of the viscous and elastic moduli. Next, with the same gradients, oscillation frequency and deformation, applying a temperature sweep from −30° C. to 30° C., the melting point is determined, which also corresponds to the crossing of the viscous and elastic moduli. It may be measured using a Physica MCR type rheometer.

The composition of the invention may be used for applications in which the use of 1,4:3,6-danhydrohexitol esters, oils and epoxidized and/or acetylated fatty acids is already known. It may especially be used as plasticizer, as lubricant, or else as stabilizer. It may be used in products in the fields of medicine, personal hygiene, packaging, paper, automotive, transport, petroleum, gas, building and construction. By way of example, the composition may especially be used for manufacturing foams or mastics. Nonetheless, as indicated above, the composition according to the invention is particularly advantageous when it is used as plasticizing composition.

Indeed, the Applicant was able to observe that the plasticizing composition made it possible to plasticize polymers excellently, at least as satisfactorily as with 1,4:3,6-dianhydrohexitol esters.

Another subject of the invention relates to the use of the composition according to the invention for plasticizing polymers. For reasons of clarity it is indicated that, according to the invention, the constituents (A) and (B) are mixed to form the plasticizing composition before the latter is used for plasticizing polymers.

The invention also relates to a process for manufacturing plasticized polymer comprising a step of bringing the plasticizing composition according to the invention into contact with a polymer. It is also specified that "bringing the plasticizing composition into contact with a polymer" means that the constituents (A) and (B) are mixed to form the plasticizing composition before bringing it into contact with the polymer.

The polymer may be chosen from vinyl polymers such as polyvinyl chloride and copolymers of vinyl chloride, polyurethanes, polyesters such as polylactic acid, cellulose polymers, starches, acrylic polymers, polyacetates, natural or synthetic rubbers, especially rubbers produced from styrene and/or butadiene, such as SBR, BR or NBR type rubbers, polyamides or mixtures of these polymers, preferentially polyvinyl chloride. According to the present invention, polyvinyl chloride means homopolymers of vinyl chloride or copolymers comprising vinyl chloride, for example vinyl acetate/vinyl chloride copolymers.

The polymer obtained in this way is a plasticized polymer. For those skilled in the art, this means that the polymer and the plasticizing composition are intimately mixed. The constituents of the plasticizing composition are introduced between the chains of the solid polymer, and after transformation a plasticized polymer consisting of a solid phase results therefrom.

Before being brought into contact with the plasticizing composition, the polymer may be in any form, for example in the form of granules or powder, or else in melt form.

It is also possible to produce a polymer paste comprising a mixture of a polymer powder and the composition according to the invention. This paste is generally referred to as plastisol and makes it possible to form objects by the processes described below. Preferentially, the mean diameter of the particles of powder is between 1 and 30 μm, for example between 1 and 20 μm. In the case of polyvinyl chloride, it is possible to obtain this type of powder by preparing the PVC by emulsion or microsuspension. This paste is generally obtained by mechanical mixing, preferentially without heating, of the polymer powder with the plasticizing composition.

Depending on the amounts of polymer and plasticizing composition chosen, these plastisols are more or less fluid. Conventionally, plastisols are prepared in rapid mixers of turbomixer type, planetary mixers or slow mixers which are planetary mixers with horizontal Z-shaped paddles.

The plasticizing composition and the polymer are advantageously mixed in weight proportions such that the amount of plasticizing composition ranges from 1 to 900 parts per 100 parts of polymer, advantageously from 5 to 180 parts, and preferentially from 15 to 120 parts of plasticizing composition. They may be introduced into the mixing system via any suitable means, such as a feed hopper, or manually.

In the case of the polymer paste, it is preferred for the amounts of plasticizing composition to range from 30 to 120 parts per 100 parts of polymer powder.

In the plasticized polymer composition, use may also be made, in addition to the plasticizing composition and the polymer, of optional additives. These additives may be chosen from stabilizers, anti-UV agents, fillers, dyes, pigments, swelling agents, emulsifiers, viscosity reducers other than the plasticizing composition, thickeners, mold-release agents, mattifying agents, adhesion agents, antistatic agents, fungicides and odoriferous agents. The amounts of each additive are chosen so as to give the desired properties during the implementation of the process or for the object finally obtained. These additives may be introduced into the composition directly or in the form of a masterbatch. The amount of optional additive generally ranges from 1 to 600 parts per 100 parts of polymer (C), generally from 2 to 80 parts.

According to a first variant, the production process of the invention comprises a step of thermomechanical mixing of a polymer and of the plasticizing composition according to the invention.

According to this first variant, the thermomechanical mixing step is performed in a mixing system which is a mixer for thermoplastics. This mixer may be chosen from blenders, Buss mixers, roll mixers and extruders.

The thermomechanical mixing step is performed at a temperature suited to the transformation temperature of the polymer. By way of example, the temperature of the mixture during the thermomechanical mixing is preferentially between 60 and 200° C. for a PVC.

For thermomechanical mixing, use may be made of a polymer in any type of form, especially in the form of granules or a powder.

According to this first variant, a preliminary step of dry blending of the plasticizing composition with the polymer before the thermomechanical mixing is advantageously performed. This dry blending may be performed in a simple mechanical mixer, which may be heated to a temperature below the melting point or gel point of the polymer.

The object may advantageously be formed by calendering, injection molding, extrusion injection molding, intrusion, dipping in a fluidized bed, electrostatic spraying, molding, rotary molding, extrusion molding, sintering, thermoforming, pressing, extrusion forming, extrusion cladding or extrusion blow molding. Use may also be made of coextrusion techniques to form multilayer objects.

According to a second variant, a process of plastisol type is used to form the object according to the invention with the polymer paste described above.

In this type of process, the forming step is generally a step of coating, dipping, padding, spraying, casting, molding, slushing or rotary molding of the polymer paste, which makes it possible to form a preformed object.

The heating step of the process is a step of baking of said preformed object, this step generally taking place after the preforming step (this is the case, for example, for coating). It may occasionally also take place during the step of forming of the preformed object (this is the case, for example, for dipping, slushing or rotary molding). This baking step may take place at a temperature of between 60 and 300° C., for example between 100 and 250° C., generally between 140 and 220° C. It may take place in air or under a controlled atmosphere, for example under an inert atmosphere.

The object-forming step is preferentially a step of coating the polymer paste onto a support, this coating being performed before the step of baking of said coated support. The coating step may be performed on a textile support, a glass web, metal, a synthetic polymer or a paper.

The coating may be performed using any coating head, for example using a doctor blade or a roll.

According to a first sub-variant, this coating may be "coating on a support" as described above, or, according to a second sub-variant, "coating without a support". In the latter case, the coated support may be detached after baking and the process also comprises a subsequent step of separation of the support to form a film or sheet of plasticized polymer. Such a support may be made of silicone paper.

The baking step is generally performed in an oven, for example a tunnel oven, on a gelling drum or under an infrared ramp.

An object comprising the plasticized polymer composition may also be formed.

The object comprising the plasticized polymer composition may be any type of object, such as a film, a sheet, a granule, a floor covering, a wall covering, a plastic coated fabric, especially an artificial leather, for example for shoes, for imitation leatherware or for furniture, a tarpaulin, a liner, for example for a swimming pool, a sun canopy, a flexible container, an item of clothing, a medical product, a glove, a boot, a seal, a protective coating, a showroom dummy, a toy, for example a ball or a doll, a tube, profiles, especially window profiles, motor vehicle parts such as a dashboard, seat, fuel tank or headrest. These parts may be cellular, foam or sponge parts, that is to say comprising air cells. They may also, on the other hand, be compact parts.

In relation to the polymers plasticized with 1,4:3,6-dianhydrohexitol esters, the phenomenon of migration of the plasticizing composition out of the polymer is drastically reduced.

Of course, improvements are even more marked when the compositions comprise low amounts of 1,4:3,6-dianhydrohexitol monoesters and or of residual acids, since these species are known to migrate more readily.

These parts may be covered with a layer of varnish, which makes it possible to even further limit this migration.

The invention will now be detailed in the following exemplary embodiments. It is specified that the latter do not in any way limit the subject of the present invention.

EXAMPLES

Example 1: Compositions

POLYSORB® ID 37: Isosorbide diester sold by ROQUETTE.
LANKROMARK® E 2307: Epoxidized soybean oil sold by AKCROS CHEMICALS.

TABLE 1

| Composition | POLYSORB ® ID 37 | LANKROMARK ® E 2307 |
|---|---|---|
| Composition 1 | 100% | — |
| Composition 2 | 70% | 30% |
| Composition 3 | 50% | 50% |
| Composition 4 | — | 100% |

Compositions 2 and 3 according to the invention are prepared by simple mechanical mixing at room temperature.

Example 2: Evaluation of Temperatures of Change of State

The freezing and melting points are determined by measuring the viscosity of the plasticizer as a function of the temperature using a Physica MCR 501 type rheometer. To measure this change in viscosity, a drop of plasticizer is placed on a plate of 50 mm diameter and at an angle of 1° (CP 50-1 geometry) for measurement of the viscous and elastic moduli as a function of the temperature. The temperature gradient is 2° C./min, the temperature sweep is from 30° C. to −30° C., the oscillation frequency is 1 Hertz and the deformation is from 1% to 0.1%. The freezing point measured corresponds to the temperature of change of state of the product subjected to the test and corresponds to the crossing of the viscous and elastic moduli. Next, with the same gradients, oscillation frequency and deformation, applying a temperature sweep from −30° C. to 30° C., the melting point is determined, which also corresponds to the crossing of the viscous and elastic moduli.

Table 2 below presents the freezing and melting points of the compositions as described in example 1.

TABLE 2

| Composition | Freezing point (° C.) | Melting point (° C.) |
|---|---|---|
| Composition 1 | −12 | 3 |
| Composition 2 | −17 | −11 |
| Composition 3 | −20 | −13 |
| Composition 4 | −7 | 3 |

This table shows the advantageous effect of compositions 2 and 3 according to the invention on the freezing points and melting points compared to compositions 1 and 4 of the prior art. The melting and freezing points are both lower than those of the pure products.

Example 3: Evaluation of the Mechanical Properties

Two formulations of PVC plasticized according to the invention are produced using the following products:
Formula 1:
MARVYLAN® S7102 PVC: 100 parts
BAEROSTAB® NT 319P stabilizer (Ca/Zn powder): 1.5 part
LANKROFLEX® E 2307 co-stabilizer (epoxidized soybean oil): 2 parts
Plasticizing composition according to example 1:34 parts
Formula 2:
MARVYLAN® S7102 PVC: 100 parts
BAEROSTAB® NT 319P stabilizer (Ca/Zn powder): 1.5 part
LANKROFLEX® E 2307 co-stabilizer (epoxidized soybean oil): 2 parts
Plasticizing composition according to example 1:60 parts
As reference, similar formulations using a standard commercial plasticizer, DINP, were also evaluated.

The preparation of pressed specimens for characterizing the mechanical properties is performed in several steps.

In a first stage, PVC (powder) is plasticized with the plasticizing composition in a Planetmix 500 planetary mixer (from Thermo Scientific) equipped with a temperature regulation circuit. A weight of 500 g of PVC is introduced into the mixer, with the corresponding amount of thermal stabilizer and of thermal co-stabilizer. When the temperature of the mixture reaches 85° C., the plasticizing composition is incorporated over the entire surface of the PVC powder. The preparation is then mixed for a further 8 minutes after absorption of the plasticizer into the PVC.

In a second stage, plates of plasticized PVC are formed using a Carver press and a mirror-polished stainless steel 30×30 cm mold equipped with a frame 2 mm thick and a mirror-polished stainless steel lid. An amount of 180 g of plasticized PVC powder is uniformly poured into the frame placed inside the mold, and everything is then covered with a lid. The assembly is placed on the plateau of the press preheated to 185° C. and the program which consists in applying a closing force of 18 000 kg at 185° C. for 2 minutes is started. After cooling to a temperature close to 45° C., the PVC plate thus obtained is then removed from the mold.

The Shore D hardness value is determined by means of a Shore D durometer of MITUTOYO HH-333 type. The indenter of the durometer is applied to a superposition of three 2 mm thick plates, i.e. a total thickness of 6 mm, and the penetration measured is read from the dial of the durometer. The Shore D hardness result corresponds to the mean of 10 measurements.

For the tensile strength test, 10 specimens of 5A type (dimensions: 25 mm×4 mm; 2 mm thick) are cut out using a hollow punch from plasticized PVC plates obtained as described above.

These specimens are then characterized in traction on a tensile testing machine or extensometer of Instron type, model 5966, with the following parameters: throughput speed=50 mm/min; cell=5 kN. The prestressing is rezeroed once the specimen is in place and the jaws have been tightened. The extensometer plots the stress/strain curve of the specimen up to the point of failure.

At the end of the test, the stress values at 100% strain and the deformation at break values are recorded.

Table 3 below shows, for each composition tested in formula 1, the Shore D hardness values, the stress values at 100% strain and deformation at break values obtained.

TABLE 3

| Plasticizer at 34 phr | Shore D hardness | Stress at 100% strain (MPa) | Deformation or elongation at break (%) |
|---|---|---|---|
| Composition 1 | 60 | 16 | 351 |
| Composition 2 | 58 | 15 | 376 |
| Composition 3 | 58 | 15 | 326 |
| Composition 4 | 58 | 16 | 313 |
| DINP | 61 | 16 | 345 |

Table 4 below shows, for each composition tested in formula 2, the Shore D hardness values, the stress values at 100% strain and deformation at break values obtained.

TABLE 4

| Plasticizer at 60 phr | Shore D hardness | Stress at 100% strain (MPa) | Deformation or elongation at break (%) |
|---|---|---|---|
| Composition 1 | 32 | 4 | 590 |
| Composition 2 | 31 | 5 | 541 |
| Composition 3 | 34 | 6 | 548 |
| Composition 4 | 34 | 6 | 546 |
| DINP | 33 | 6 | 551 |

These tests show that compositions 2 and 3 according to the invention plasticize the polymer at least as satisfactorily as compositions 1 and 4 of the prior art.

Example 4: Effect on the Migration Properties of the Plasticizing Composition

One of the essential criteria for any plasticized polymer is the degree of migration of the plasticizing composition used. Specifically, it should be minimal if it is desired to preserve the properties of the material over time.

Preparation of the Tests:

Starting with a plasticized PVC plate as prepared in example 1, PVC specimens are cut out (40×40 mm, 2 mm thick). They are conditioned for 72 hours at 20° C.—65% RH. For each PVC specimen to be tested, two absorbent supports of non-plasticized PVC of Komadur type (from Sigma PLV) of dimensions 80×80 mm by 1 mm thick are prepared. The specimens and the absorbent supports are weighed on a precision balance. The plasticized PVC specimens are then placed between the two absorbent supports, at their center. This assembly is placed between two glass plates, and a 5 kg weight is then placed on top. Everything is placed in a ventilated oven at 70° C. for one week. After one week in the oven, the specimens are reconditioned at 20° C.—65% RH for 2 days. Finally, they are weighed again in order to determine the degree of migration (T) of the specimen via the following calculation:

$T$=(mass of specimen before oven−mass of specimen after oven)×100/mass of specimen before oven.

For the compositions according to the invention, which comprise a % of diester (A) and b % of compound (B), the synergistic effect is determined by calculating, relative to the theoretical degree of migration, the percentage reduction in migration (P) according to the following formula:

$P=(T-Tth)/Tth \times 100$, with $Tth$=% $a \times T_A$+% $b \times T_B$

The results are given in table 5 for formula 1 and table 6 for formula 2.

TABLE 5

| Plasticizer at 34 phr | Degree of migration (%) | Percentage reduction in migration (%) |
|---|---|---|
| Composition 1 | 2.4 | |
| Composition 2 | 1.4 | −22% |
| Composition 3 | 0.6 | −57% |
| Composition 4 | 0.4 | |
| DINP | 1.2 | |

TABLE 6

| Plasticizer at 60 phr | Degree of migration (%) | Percentage reduction in migration (%) |
|---|---|---|
| Composition 1 | 9.2 | |
| Composition 2 | 5.1 | −27% |
| Composition 3 | 4.3 | −22% |
| Composition 4 | 1.8 | |
| DINP | 4.6 | |

These tables show a synergistic effect of compositions 2 and 3 according to the invention compared to compositions 1 and 4 of the prior art, in terms of resistance to migration. The degree of migration is also similar to that observed for a polymer plasticized by DINP, which is a standard commercial plasticizer of PVC.

The invention claimed is:

1. A composition which is liquid at room temperature and which comprises:
   at least one 1,4:3,6-dianhydrohexitol diester (A);
   at least one compound (B), selected from the group consisting of modified fatty acids and modified fatty acid esters, said compound comprising at least one epoxy and/or acetyl function;
   said liquid composition comprising at least 60% by weight of constituents (A) and (B).

2. The composition as claimed in claim 1, wherein at least one compound (B) is a modified fatty acid ester.

3. The composition as claimed in claim 1, wherein at least one compound (B) is a triglyceride comprising at least one modified fatty acid.

4. The composition as claimed in claim 1, wherein at least one compound (B) comprises at least one epoxy function.

5. The composition as claimed in claim 3, wherein at least one compound (B) is a triglyceride of at least one modified fatty acid comprising at least one epoxy function.

6. The composition as claimed in claim 1, wherein the triglyceride is an epoxidized soybean oil and/or an epoxidized linseed oil.

7. The composition as claimed in claim 1, wherein at least one 1,4:3,6-dianhydrohexitol diester (A) is a 1,4:3,6-dianhydrohexitol alkyl diester.

8. The composition as claimed in claim 7, wherein at least one of the alkyl groups of the 1,4:3,6-dianhydrohexitol ester is a $C_{1-24}$ alkyl group.

9. The composition as claimed in claim 1, wherein at least one 1,4:3,6-dianhydrohexitol diester (A) is an isosorbide diester.

10. The composition as claimed in claim 1, wherein said composition comprises at least 80% by weight of constituents (A) and (B).

11. The composition as claimed in claim 1, wherein a weight ratio (A)/(B) ranges from 95/5 to 5/95.

12. The composition as claimed in claim 1, wherein a weight ratio (A)/(B) ranges from 80/20 to 40/60.

13. A polymer plasticizing composition comprising the composition as claimed in claim 1.

14. A process for producing plasticized polymer comprising a step of bringing the composition as claimed in claim 1 into contact with a polymer.

15. The process according to claim 14, wherein migration of the plasticizing compound is reduced.

16. The process according to claim 14, wherein said polymer is selected from the group consisting of vinyl polymers, polyurethanes, polyesters, cellulose polymers, starches, acrylic polymers, polyacetates, natural rubbers, synthetic rubbers, polyamides, and mixtures thereof.

17. The composition as claimed in claim 6, wherein the triglyceride is an epoxidized soybean oil.

18. The composition as claimed in claim 8, wherein at least one of the alkyl groups of the 1,4:3,6-dianhydrohexitol ester is a $C_{3-15}$ alkyl group.

19. The composition as claimed in claim 8, wherein at least one of the alkyl groups of the 1,4:3,6-dianhydrohexitol ester is a $C_{4-10}$ alkyl group.

20. The composition as claimed in claim 8, wherein at least one of the alkyl groups of the 1,4:3,6-dianhydrohexitol ester is a $C_{6-9}$ alkyl group.

21. The composition as claimed in claim 1, wherein said composition consists of constituents (A) and (B).

22. The composition as claimed in claim 1, wherein a weight ratio (A)/(B) ranges from 90/10 to 20/80.

23. The composition as claimed in claim 1, wherein a weight ratio (A)/(B) ranges from 85/15 to 30/70.

24. The process according to claim 14, wherein said polymer is selected from the group consisting of polyvinyl chloride and copolymers of vinyl chloride.

25. The process according to claim 14, wherein said polymer is polyvinyl chloride.

* * * * *